(12) United States Patent
Couwenhoven et al.

(10) Patent No.: US 7,190,485 B2
(45) Date of Patent: *Mar. 13, 2007

(54) METHOD FOR MULTILEVEL PRINTING OF DIGITAL IMAGES USING REDUCED COLORANT AMOUNTS

(75) Inventors: Douglas W. Couwenhoven, Fairport, NY (US); Kevin E. Spaulding, Spencerport, NY (US); Rodney L. Miller, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 902 days.

This patent is subject to a terminal disclaimer.

(21) Appl. No.: 09/881,460

(22) Filed: Jun. 14, 2001

(65) Prior Publication Data

US 2003/0002058 A1  Jan. 2, 2003

(51) Int. Cl.
*G06F 15/00* (2006.01)

(52) U.S. Cl. .................. 358/1.9; 358/3.01; 358/3.23; 358/502; 358/515; 358/518; 358/521; 382/162; 382/163; 382/167

(58) Field of Classification Search ............... 358/1.9, 358/466, 2.99, 3.01, 3.23, 502, 518, 515, 358/521; 345/612; 382/162, 163, 167, 172; 347/15

See application file for complete search history.

(56) References Cited

U.S. PATENT DOCUMENTS

| | | | |
|---|---|---|---|
| 4,930,018 A | 5/1990 | Chan et al. | |
| 5,012,257 A | 4/1991 | Lowe et al. | |
| 5,515,479 A | 5/1996 | Klassen | |
| 5,563,985 A | 10/1996 | Klassen et al. | |
| 5,633,662 A * | 5/1997 | Allen et al. | 347/15 |
| 5,832,109 A * | 11/1998 | Mahy | 382/162 |
| 5,857,063 A * | 1/1999 | Poe et al. | 358/1.9 |
| 6,042,211 A * | 3/2000 | Hudson et al. | 347/15 |
| 6,057,932 A * | 5/2000 | Yoshida et al. | 358/1.9 |
| 6,081,340 A * | 6/2000 | Klassen | 358/1.1 |
| 6,084,689 A * | 7/2000 | Mo | 358/1.9 |
| 6,088,122 A * | 7/2000 | Coleman | 358/1.9 |
| 6,234,600 B1 * | 5/2001 | Danzuka et al. | 347/15 |
| 6,312,101 B1 * | 11/2001 | Couwenhoven et al. | 358/521 |
| 6,327,052 B1 * | 12/2001 | Falk | 358/1.9 |
| 6,331,899 B1 * | 12/2001 | Samadani | 358/1.9 |
| 6,435,657 B1 * | 8/2002 | Couwenhoven et al. | 347/43 |
| 6,445,463 B1 * | 9/2002 | Klassen | 358/1.9 |
| 6,690,485 B1 * | 2/2004 | Borrell et al. | 358/1.9 |
| 6,972,857 B2 * | 12/2005 | Mantell et al. | 358/1.14 |
| 2003/0098986 A1 * | 5/2003 | Pop | 358/1.9 |
| 2004/0109180 A1 * | 6/2004 | Braun et al. | 358/1.9 |
| 2006/0056683 A1 * | 3/2006 | Komatsu | 382/162 |

* cited by examiner

*Primary Examiner*—Kimberly Williams
*Assistant Examiner*—Beniyam Menberu
(74) *Attorney, Agent, or Firm*—Raymond L. Owens

(57) ABSTRACT

A method for modifying an input digital image having an (x, y) array of pixels, each pixel having an input code value for one or more color channels, wherein said input code value has a nonlinear relationship to colorant amount, to form an output digital image containing output code values for each pixel subject to a total colorant amount limit.

7 Claims, 4 Drawing Sheets

METHOD FOR MULTILEVEL PRINTING OF DIGITAL IMAGES USING REDUCED COLORANT AMOUNTS

CROSS REFERENCE TO RELATED APPLICATIONS

Reference is made to commonly assigned U.S. patent application Ser. No. 09/213,637 filed Dec. 17, 1998 by Couwenhoven, et al., now U.S. Pat. No. 6,407,825, the disclosure of which is herein incorporated by reference.

FIELD OF THE INVENTION

This invention pertains to the field of digital imaging, and more particularly to a colorant reduction method used during the process of printing a digital image.

BACKGROUND OF THE INVENTION

In the field of digital printing, a digital printer receives digital data from a computer and places colorant on a receiver to reproduce the image. A digital printer may use a variety of different technologies to transfer colorant to the page. Some common types of digital printers include inkjet, thermal dye transfer, thermal wax, electrophotographic, and silver halide printers.

Often when printing digital images, undesirable image artifacts may result when an excessive amount of colorant is placed in a small area on the page. These image artifacts degrade the image quality, and can result in an unacceptable print. In the case of an inkjet printer, some examples of these image artifacts include bleeding, cockling, banding, and noise. Bleeding is characterized by an undesirable mixing of colorants along a boundary between printed areas of different colorants. The mixing of the colorants results in poor edge sharpness, which degrades the image quality. Cockling is characterized by a warping or deformation of the receiver that can occur when printing excessive amounts of colorant. In severe cases, the receiver may warp to such an extent as to interfere with the mechanical motions of the printer, potentially causing damage to the printer. Banding refers to unexpected dark or light lines or streaks that appear running across the print, generally oriented along one of the axes of motion of the printer. Noise refers to undesired density or tonal variations that can give the print a grainy appearance, thus degrading the image quality. Although these artifacts are presented in the context of an inkjet printer, it is known to those skilled in the art that similar artifacts commonly exist with the other above mentioned printing technologies also.

In a digital printer, satisfactory density and color reproduction can generally be achieved without using the maximum possible amount of colorant. Therefore, using excessive colorant not only introduces the possibility of the above described image artifacts occurring, but is also a waste of colorant. This is disadvantageous, since the user will get fewer prints from a given quantity of colorant.

It has been recognized in the art that the use of excessive colorant when printing a digital image needs to be avoided. Generally, the amount of colorant needed to cause image artifacts (and therefore be considered excessive) is receiver, colorant, and printer technology dependent. Many techniques of reducing the colorant amount are known for binary printers in which a halftoning process is used (typically inside a software printer driver program) to convert input digital image data into "on" or "off" states at each pixel. In such printers, the input image to the halftoning process is a higher bit precision image, typically 8 bits (or 256 levels) per pixel, per color.

U.S. Pat. No. 4,930,018 to Chan et al teaches a method of reducing paper cockle and graininess of inkjet prints utilizing multiple inks with different dye loadings. In this method, a given grey level can be reproduced a variety of different ways, some of which will use more colorant than others. The different ways to reproduce a given grey level are rank ordered according to the total ink coverage, and a selection is made by iterating through the order until one is found that satisfies a specified maximum coverage limit.

U.S. Pat. No. 5,515,479 to Klassen teaches a method for reducing marking material (i.e., ink) coverage in a printing process by determining the ink coverage for each pixel in an image, determining if too much ink will be placed on the page in a given area, and reducing the amount of ink to an acceptable level by turning "off" a fraction of the pixels in the given area. The determination of which pixels to turn off is made by using a processing order through each area which tends to randomize the turn off effect. While this method successfully reduces the amount of ink placed on the page in a given area, it can introduce pattern noise into the image because of the processing order method of selecting which pixels to turn off. Also, the pixels that are turned off in each color separation are not correlated, which can lead to a grainy appearance to an image region that should appear otherwise uniform.

U.S. Pat. No. 5,563,985 to Klassen addresses the problem of pattern noise by selecting which pixels to turn off in response to a random number function. While this method successfully eliminates pattern noise that can be generated in a given area, it can introduce random noise into the image because the selection of which pixels to turn off is determined by a random process. While this may be visually less objectionable than pattern noise, it is still not optimal.

U.S. Patent No. 5,012,257 to Lowe et al. describes a "superpixel" printing strategy to reduce bleed across color field boundaries. This strategy limits printing to no more than two drops of ink per cell or pixel, and no more than a total of three drops per superpixel, where a superpixel consists of a 2×2 array of pixel cells. This strategy controls bleed, but at a penalty in terms of color and spatial resolution.

U.S. Pat. No. 6,081,340 to Klassen teaches a method for reducing marking material (i.e., ink) coverage in a printer that has a nonlinear marking material coverage. As understood, this method applies to a halftoned image signal where the number of gray levels in the image has been reduced to match the number of available printing levels in the printer. A coverage calculator is then used to determine the amount of marking material that is present in a local 8×8 region of the current pixel. This method is disadvantaged because it operates after the halftoning process, and is therefore required to sample a region of the halftoned image data in order to estimate the marking material coverage, which can be time consuming. Also, the process of reducing the marking material coverage is limited to turning off integer numbers of discrete dots, therefore limiting the fidelity of the reduction step.

The above mentioned references teach methods of reducing artifacts associated with excessive colorant usage by utilizing methods that operate on the digital data after halftoning. That is, the above techniques operate primarily on bitmaps of image data where each pixel is represented by a code value of 0 ("off", meaning no colorant), or 1 ("on", meaning fall colorant). At this point in the imaging chain of a digital printer, much information has been lost due to the halftoning process, and accurately controlling the total colorant amount becomes more costly and less accurate relative to a pre-halftoning algorithm. U.S. Pat. No. 5,633,662 to Allen et al. teaches a method of reducing colorant using a pre-halftoning algorithm that operates on higher bit precision data (typically 256 levels, or 8 bits per pixel, per color). However, this method is intended for a binary printer where the halftone dot area is substantially linear with digital code value, and therefore the amount of colorant placed on the page is substantially linear with the digital code values that are used to drive the printer. In general, this arrangement will not be optimal for a multilevel printer.

In a multilevel printer, the colorant amount is typically not linear with digital code value. That is, if the digital code value (in a pre-halftone algorithm) is reduced by a certain percentage, the colorant amount is typically not reduced by the same percentage. In fact, the percentage of colorant amount reduction will typically vary based on the density (lightness/darkness) of the pixel. A printer with this characteristic is not handled well by any of the prior art methods, as they all assume that colorant amount is linear with digital code value.

Thus, there is a need for a colorant reduction algorithm which can be applied to a multilevel printer to provide for high quality images free from the artifacts associated with using excess colorant.

SUMMARY OF THE INVENTION

It is an object of the present invention to provide for printing high quality digital images that are free of the above described artifacts associated with using excessive amounts of colorant.

It is a further object of the present invention to reduce the amount of colorant used to print an image on a multilevel printer in which the colorant amount may not be linear with digital code value, thereby resulting in improved image quality relative to the prior art.

These objects are achieved by a method for modifying an input digital image having an (x,y) array of pixels, each pixel having an input code value for one or more color channels, wherein said input code value has a nonlinear relationship to colorant amount, to form an output digital image containing output code values for each pixel subject to a total colorant amount limit, comprising the steps of:

a) determining an input colorant amount for each color channel of a pixel in response to the corresponding input code value and a colorant amount function that relates the input code value to the colorant amount for the corresponding color channel;

b) determining a modified colorant amount for each color channel of the image pixel responsive to the input colorant amount for each color channel and a total colorant amount limit;

c) determining an output code value for each color channel of the pixel responsive to the modified colorant amount and an inverse colorant amount function that relates colorant amount to the output code value for the corresponding color channel, and d) repeating steps (a) through (c) for each pixel in the input digital image.

ADVANTAGES

The present invention has an advantage over the prior art in that it provides for reducing the amount of colorant used to print a digital image without introducing random noise into the image. Another advantage of the present invention is that it can be applied to multilevel printers in which the colorant amount is not necessarily linear with digital code value. Yet another advantage of the present invention is that the maximum amount of colorant is more accurately controlled for a multilevel printer relative to the prior art methods, providing for improved control over image artifacts associated with using excess colorant. It is a feature of the present invention that colored images are produced which are esthetically pleasing and free from the above described artifacts.

DETAILED DESCRIPTION OF THE INVENTION

This invention describes a method for reducing the amount of colorant used in printing a digital image to avoid undesirable image artifacts that degrade the image quality of a digital print. The invention is presented hereinafter in the context of an inkjet printer. However, it should be recognized that this method is applicable to other printing technologies as well.

An input digital image is composed of a two dimensional array of individual picture elements, or pixels, and can be represented as a function of two spatial coordinates, (x and y), and a color channel coordinate, c. Each unique combination of the spatial coordinates defines the location of a pixel within the image, wherein the pixel possesses input code values representing the amount of ink present at the given location for each of a number of different inks represented by the color channel coordinate, c. Each code value representing the amount of ink in a color channel is generally represented by numbers on the range {0,255}, and a typical set of inks for an inkjet printer consists of cyan (C), magenta (M), yellow (Y), and black (K) inks. Although the present invention will be described in the context of an inkjet printer with C, M, Y, and K colorants, the invention can be applied to other printer technologies and colorants as well. In the context of an inkjet printer, the colorant amounts will be described in terms of ink volume, but one skilled in the art will recognize that other metrics may be more convenient for computing the colorant amount for different printing technologies. Another example of the input colorant amount that can be used is the mass of toner that is used in an electrophotographic printer.

Figure 1:
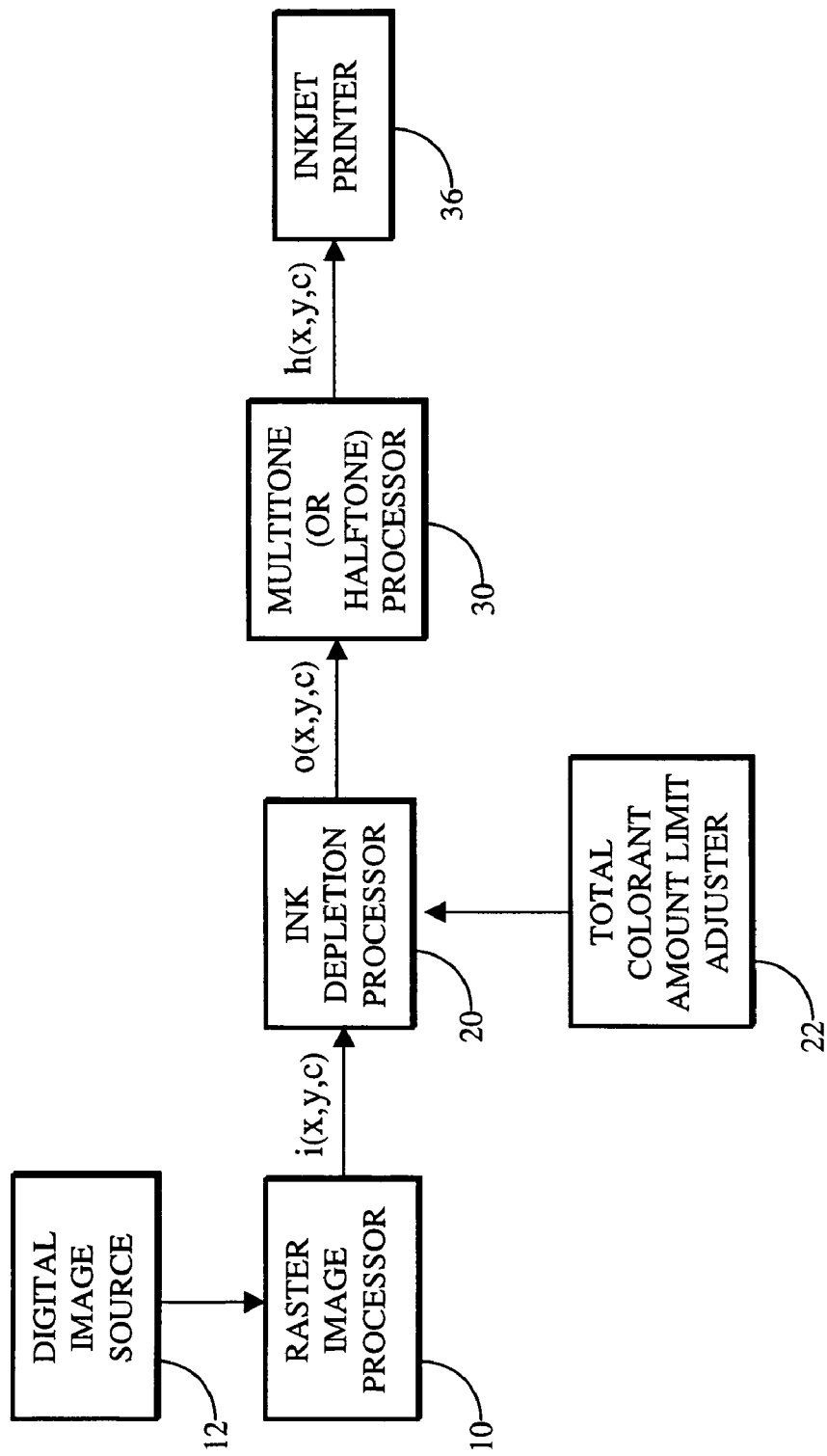
FIG. 1 is a flow diagram showing the placement of the ink depletion processor in an inkjet printer or printer driver.

Referring to FIG. 1, a generic image processing algorithm chain is shown for an inkjet printer in which a raster image processor 10 receives digital image data in the form of an input image from a digital image source 12 which may be a host computer, network, computer memory, or other digital image storage device. The raster image processor 10 applies imaging algorithms to produce a processed digital image signal having input code values i(x, y, c), where x, y are the spatial coordinates of the pixel location, and c is the color channel coordinate. In one embodiment of the present invention, c has values 0, 1, 2, 3 corresponding to C, M, Y, K color channels. In another embodiment of the present invention, the input image is an RGB image and the values for c are 0, 1, 2. The types of imaging algorithms applied in the raster image processor 10 typically include sharpening (sometimes called "unsharp masking" or "edge enhancement"), color conversion (converts from the source image color space, typically RGB, to the CMYK color space of the printer), resizing (or spatial interpolation), and others. The imaging algorithms that are applied in the raster image processor 10 can vary depending on the application, and are not fundamental to the present invention.

Following the raster image processor 10 of FIG. 1 is an ink depletion processor 20, which receives the input code value $i(x, y, c)$ and a total colorant amount limit $V_t$, and produces a depleted image signal having output code values $o(x, y, c)$. The total colorant amount limit $V_t$ is provided by a total colorant amount limit adjustor 22, which is typically adjusted by the user to provide acceptable image quality for a given ink and receiver media combination. The ink depletion processor 20 performs the function of reducing the total colorant amount (per pixel, or per unit area) below the specified limit $V_t$ to prevent image artifacts from occurring. There are many different methods presented in the prior art to accomplish this, and the particular algorithm used in the ink depletion processor is not fundamental to the invention. In a preferred embodiment of the present invention, the algorithm used in the ink depletion processor is disclosed in commonly assigned U.S. patent application Ser. No. 09/213, 637 filed Dec. 17, 1998 by Couwenhoven, et al., now U.S. Pat. No. 6,407,825, the disclosure of which is herein incorporated by reference. This disclosure teaches a method of turning off pixels in an image region having excess colorant in response to a spatially periodic dither signal. The dither signal is constructed to have "blue noise" characteristics that have minimal visibility to the human eye.

Still referring to FIG. 1, the ink depletion processor 20 is followed by a multitone processor 30 which receives the output code value $o(x, y, c)$ and produces a multitoned image signal $h(x, y, c)$. The multitone processor 30 performs the function of reducing the number of bits used to represent each image pixel to match the number of printing levels available in the printer. Typically, the output code value $o(x, y, c)$ will have 8 bits per pixel (per color), and the multitone processor 30 generally reduces this to 1 to 3 bits per pixel (per color) depending on the number of available printing levels. The multitone processor 30 may use a variety of different methods known to those skilled in the art to perform the multitoning. Such methods typically include error diffusion, clustered-dot dithering, or stochastic (blue noise) dithering. The particular multitoning method used in the multitone processor 30 is not fundamental to the present invention, but the present invention does require that the ink depletion processor 20 is applied prior to the multitone processor 30 in the imaging chain. Finally, an inkjet printer 36 receives the multitoned image signal $h(x, y, c)$, and deposits ink on the page at each pixel location according to the value of the multitoned image signal $h(x, y, c)$ to produce the desired image. All of the pixels in the input digital image are sequentially processed through the image chain of FIG. 1, and sent to the inkjet printer 36, which typically prints the pixels in a raster scanned fashion.

Figure 2:
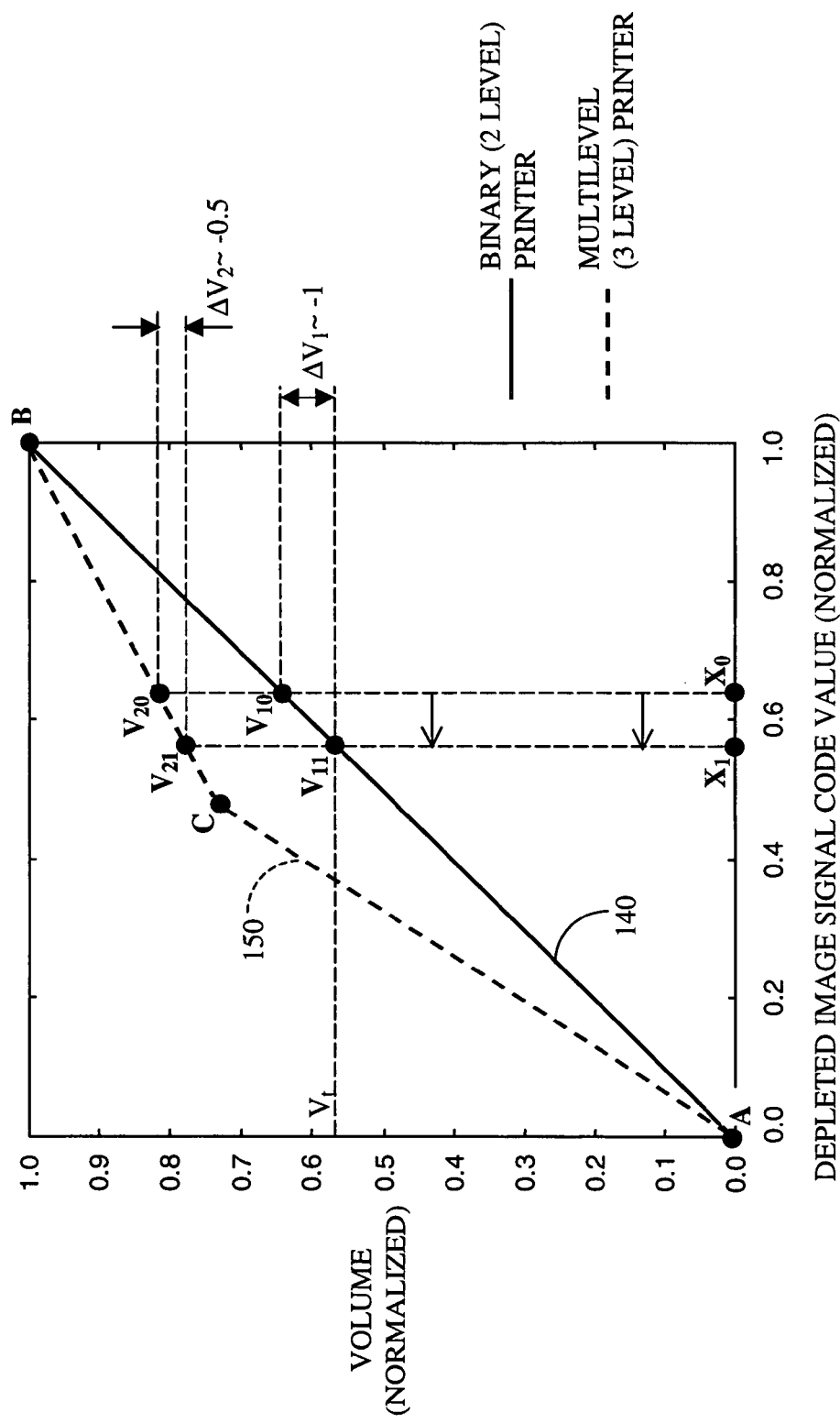
FIG. 2 is a graph showing comparing the volume change for a given code value change for binary and multilevel printers.

Turning now to FIG. 2, an example of the ink volume deposited on the page as a function of the output code value $o(x, y, c)$ (normalized on the range $\{0, 1\}$) is shown for a binary printer as a solid line 140, and for a multilevel printer as a dashed line 150. These will be referred to hereinafter as the binary printer colorant volume function 140, and the multilevel printer colorant volume function 150. A binary printer can eject either no drop (i.e., volume 0) as indicated by point "A", or one drop with normalized volume 1.0, as indicated by point "B" at each pixel. The multilevel printer can print these two, plus an additional drop that has a normalized drop volume of roughly 0.72, as indicated by point "C". Ink drops corresponding to points A, B, and C will be hereinafter referred to as "drop A", "drop B", and "drop C" respectively. For illustration purposes, the normalized code values that correspond to drops A, B, and C will be 0, 0.5, and 1.0, respectively. It is important to understand that even though the printers can eject discrete ink drops with fixed volumes at each pixel, it is possible to have a fractional colorant volumes at each pixel due to the halftoning (or multitoning) step. This will now be described in more detail, as it is fundamental to the understanding of the invention.

As an illustration, consider a printer system as shown in FIG. 1, but where the ink depletion processor 20 has been disabled. That is, the output of the ink depletion processor 20, $o(x, y, c)$, is set to be identical to the input, $i(x, y, c)$. Also consider for a given pixel that the raster image processor 10 of FIG. 1 produces a normalized code value of 0.62, as indicated by the point $X_0$ of FIG. 2. In the case of the binary printer, the multitone (halftone) processor 30 generates a multitoned image signal for this pixel which has a 62% probability of being "on" (i.e., drop B with normalized drop volume 1.0 is ejected at this pixel), and a 38% probability of being "off" (i.e., no drop ejected at this pixel). Thus, conceptually, it can be said that the colorant volume per pixel for a normalized code value of 0.62 is 0.62 normalized volume units, as indicated by point $V_{10}$. Indeed, if an image containing 100 pixels all having a normalized code value of 0.62 is processed by the multitone processor 30 with 2 possible output levels, then 62 of the pixels in the multitoned image signal $h(x, y, c)$ would be "on" (drop B), and 38 would be "off" (drop A). This same calculation can be performed for any normalized code value between 0.0 and 1.0 to arrive at the binary printer colorant volume function 140 of FIG. 2.

The same calculation shown above can be repeated for a multilevel printer to arrive at the multilevel printer colorant volume function 150 of FIG. 2. Consider in the case of a multilevel printer that the same normalized code value of 0.62 is produced by the raster image processor 10 of FIG. 1, and that the ink depletion processor 20 is still disabled as in the above example. In this case, the multitone processor 30 will generate a multitoned image signal $h(x, y, c)$ that has $(0.62-0.50)/(1.00-0.50)=0.24$, or a 24% chance of being a drop B, and a $100-24=76\%$ chance of being a drop C. Thus, if an image containing 100 pixels all having a normalized code value of 0.62 is processed by the multitone processor 30 with 3 possible output levels, then 24 of the pixels in the multitoned image signal $h(x, y, c)$ would be drop B, and 76 would be drop C. Thus, the normalized drop volume per pixel produced by the multilevel printer for a normalized code value of 0.62 can be computed by simple linear interpolation between the normalized volumes of drop C and drop B according to $(0.24)(1.0)+(0.76)(0.72)=0.79$, as indicated by point $V_{20}$. This same calculation can be performed for any normalized code value between 0.0 and 1.0 to arrive at the multilevel printer colorant volume function 150 of FIG. 2.

Still referring to FIG. 2, the functioning of the ink depletion processor 20 of FIG. 1 will now be examined for both the binary and multilevel printer cases. The total colorant amount for each pixel is the sum of the colorant amounts for each color channel of the pixel. In either case, the ink depletion processor 20 will attempt to modify the normalized code value to ensure that a normalized colorant volume limit $V_t$ is not exceeded. All implementations of the ink depletion processor 20 will strive for this goal, and therefore the particular implementation of the ink depletion processor 20 is not fundamental to the invention. As mentioned earlier, the prior art ink depletion algorithms implicitly assume that the relationship between code value and drop volume is linear, corresponding to the binary printer colorant volume function 140 of FIG. 2. Thus in the prior art, a total code value limit (corresponding to the point $X_1$ of FIG. 2) is used as an indicator of the normalized colorant volume limit $V_t$. For the case of the binary printer, this assumption is valid, and the prior art ink depletion algorithms will reduce the normalized code value from $X_0$ to $X_1$, causing the normalized drop volume per pixel to decrease from $V_{10}$ to $V_{11}$, thereby satisfying the normalized colorant volume limit $V_t$ constraint. However, if the same assumption is made in the case of a multitone printer, reducing the normalized code value from $X_0$ to $X_1$ causes the normalized drop volume per pixel to decrease from $V_{20}$ to $V_{21}$. Not only does this not satisfy the normalized colorant volume limit $V_t$ constraint, but the actual reduction in normalized drop volume $\Delta V_2$ is less than what was expected, indicated by $\Delta V_1$. Clearly, the assumptions made by the prior art ink depletion algorithms will not perform as expected with a printer having a nonlinear colorant volume function as shown in FIG. 2.

The goal of the present invention is to modify the normalized code value for a multitone printer in such a way that any ink depletion algorithm that assumes a linear printer colorant volume function can be used. Essentially, this means restoring the linearity between the image signal normalized code value and the normalized ink drop volume. A means for accomplishing this goal will now be described.

Figure 3:
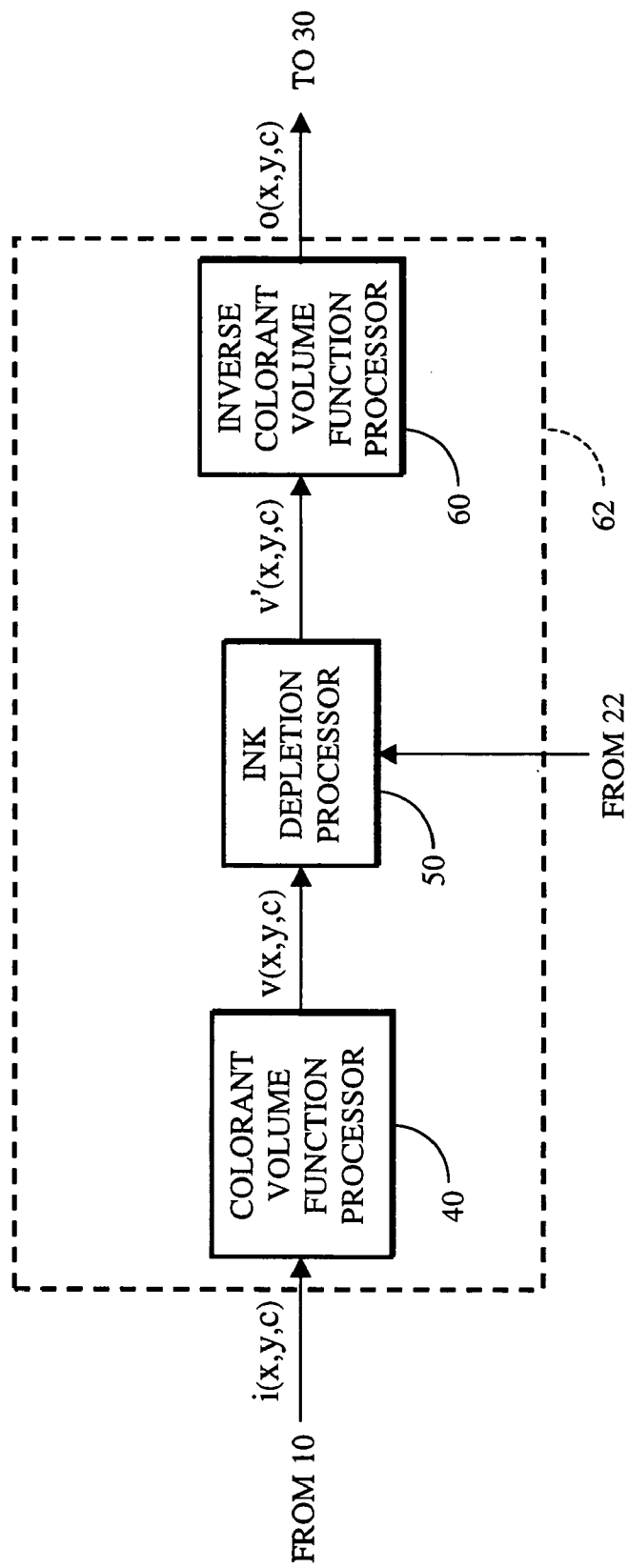
FIG. 3 is a flow diagram showing a preferred embodiment of the present invention.

In a preferred embodiment of the invention, as shown in FIG. 3, a volumetric ink depletion processor 62 is used in place of the ink depletion processor 20 of FIG. 1. The volumetric ink depletion processor 62 contains an colorant volume function processor 40, an ink depletion processor 50, and an inverse colorant volume function processor 60. In this embodiment, an inkjet printer is used, so the colorant is measured in terms of ink volume. However, for other printing technologies that measure colorant differently, the colorant volume function processor 40 and inverse colorant volume function processor 60 would be appropriately modified to a colorant amount function processor and inverse colorant amount function processor that produce colorant amounts in an appropriate metric, such as toner mass for an electrophotographic printer. The colorant volume function processor 40 receives the input code value i(x, y, c), and produces a volume code value v(x, y, c). (Typically, the volume code value will be represented by an integer digital code value, but it could also be represented by a floating point number.) The colorant volume function processor 40 operates in such a way that the normalized ink drop volume is linear with respect to the volume code value v(x, y, c). The ink depletion processor 50 then receives the volume code value v(x, y, c) and a total code value limit $V_t$, and produces a depleted volume code value v'(x, y, c). The total code value limit $V_t$ is produced by a total colorant amount limit adjustor 22, such as in FIG. 1. Since the ink depletion processor 50 operates on the volume code value v(x, y, c), the assumption that normalized ink drop volume is linear with code value is satisfied, and the ink depletion processor 50 will therefore produce the desired result. The inverse colorant volume function processor 60 receives the depleted volume code value v'(x, y, c) and produces the output code value o(x, y, c). The output of the inverse colorant volume function processor 60 is applied to a multitone (halftone) processor 30 such as shown in FIG. 1. In this embodiment of the present invention, the inverse colorant volume function processor 60 implements substantially the inverse mathematical transform of the colorant volume function processor 40. This provides a conversion of the depleted volume code value v'(x, y, c) back to the "original" space of the output code value o(x, y, c) prior to multitoning. In this manner, the overall code value to colorant volume relationship is maintained by the volumetric ink depletion processor 62, but the actual process of reducing the amount of colorant performed by the ink depletion processor 50 is performed on a volume code value v(x, y, c) that is linear with colorant volume, and therefore a more accurate reduction of the colorant amount is achieved.

Figure 4:
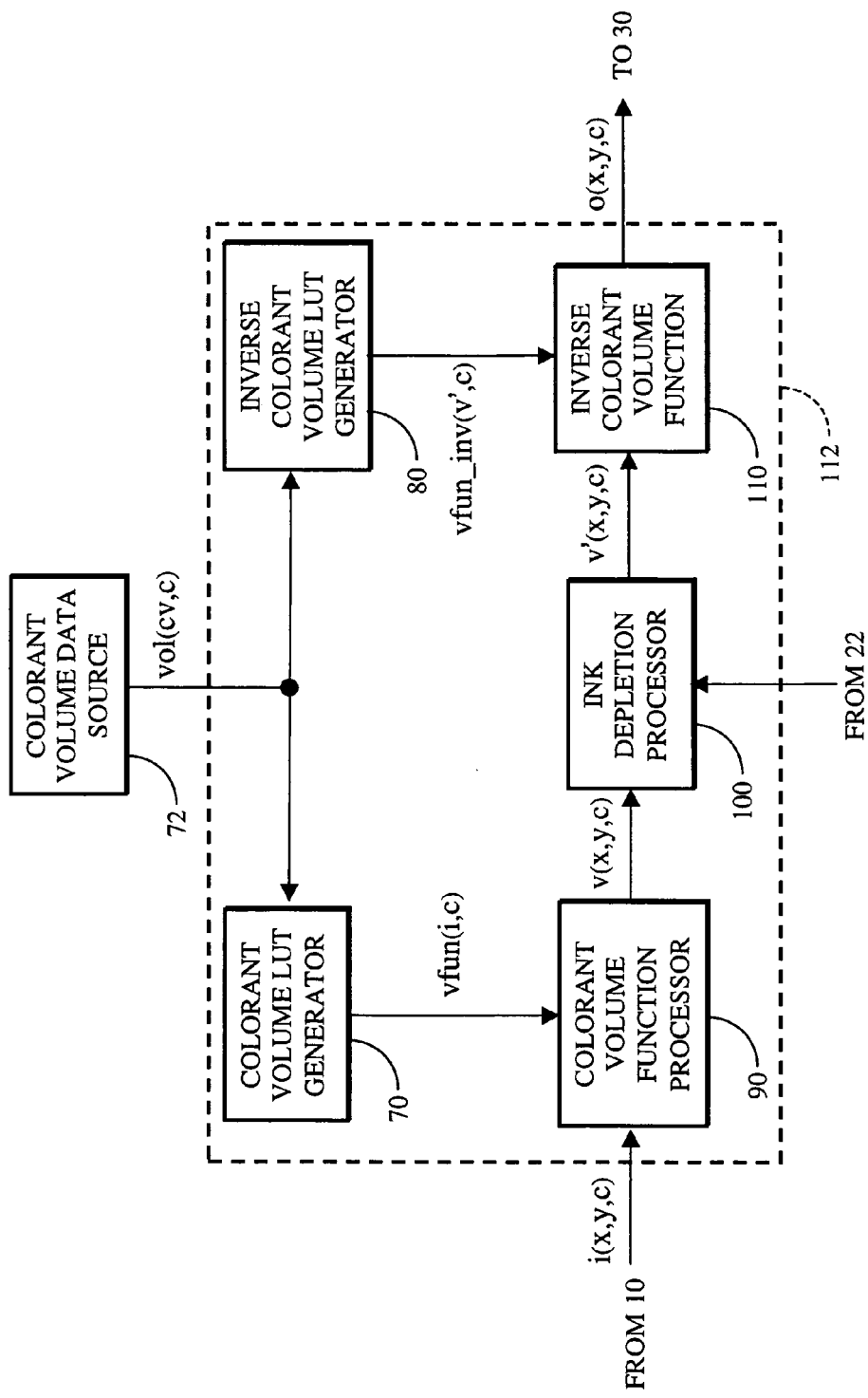
FIG. 4 is a flow diagram showing another preferred embodiment of the present invention.

In the above embodiment of the present invention, the colorant volume function processor 40 and inverse colorant volume function processor 60 are pre-programmed with volume data that relates to the shape of the colorant volume function for the particular printer, such as the multilevel printer colorant volume function 150 of FIG. 2. Turning now to FIG. 4, another embodiment of the present invention is shown in which the volume data needed to specify the colorant volume function is provided (preferably by the raster image processor 10 of FIG. 1) to a volumetric ink depletion processor 112 via a colorant volume data source 72. The colorant volume data source 72 is typically a data file stored on computer disk or programmable memory that is accessible to the volumetric ink depletion processor 112. The volume data consists of an array of code value and ink drop volume pairs for each colorant, and is indicated by a volume data signal, vol(cv, c), where cv is the code value and c is the colorant index. In this embodiment, a colorant volume LUT generator 70 receives the volume data signal vol(cv, c), and creates a lookup table vfun(i, c), which is supplied to a colorant volume function processor 90. Similarly, an inverse colorant volume LUT generator 80 receives the volume data signal vol(cv, c), and creates a lookup table vfun_inv(v', c), which is supplied to an inverse colorant volume function processor 110. The lookup table vfun(i, c) is created such that the output of the lookup table will be linear with ink drop volume as discussed above. The lookup table vfun_inv(v', c) is created such that it provides substantially the inverse mathematical transform as the lookup table vfun(i, c). The colorant volume function processor 90 uses the lookup table vfun(i, c) to convert the input code value i(x, y, c) into a volume code value v(x, y, c).

The process of creating the lookup table vfun(i, c) based on the volume data signal vol(cv, c) and the process of applying the lookup table vfun(i, c) to the input code value i(x, y, c) are image processing techniques that will be well known to those skilled in the art. It is assumed that the volume data signal vol(cv, c) is known for a given printer, or can be measured directly using test image signals. The code value and ink drop volume pairs of the volume data signal are then fit with a spline curve to interpolate the ink drop volumes between the sampled code value points. Then, the spline fit is sampled at a number of equally spaced discrete code values corresponding to the number of possible levels of the input code value, which is typically 256, and the 256 corresponding code value and ink drop volume pairs are stored as the lookup table vfun(i, c). This process is performed independently for each color, as it is possible for each color channel to have a different volume data signal. The colorant volume function processor 90 applies the lookup table vfun(i, c) to the input code values i(x, y, c) by simply addressing the lookup table vfun(i, c) with the input code value, and retrieving the result.

Similarly, the lookup table vfun_inv(v', c) is created from the volume data signal vol(cv, c), except that the process is "inverted", such that the ink drop volume is sampled at a number of equally spaced discrete volumes and the spline fit is used to compute the corresponding code values. The inverse colorant volume function processor 110 applies the lookup table vfun_inv(v', c) to the depleted volume code value v'(x, y, c) by simply addressing the lookup table vfun_inv(v', c) with the depleted volume code value, and retrieving the result. As mentioned above, these techniques are well known to those skilled in the art.

Still referring to FIG. 4, an ink depletion processor 100 receives the volume code value v(x, y, c) and the total code value limit $V_t$, and produces a depleted volume code value v'(x, y, c). As described in the first embodiment, since the ink depletion processor 100 operates on the volume code value v(x, y, c), the assumption that normalized ink drop volume is linear with code value is satisfied, and the ink depletion processor 100 will therefore produce the desired result. The inverse colorant volume function processor 110 receives the depleted volume code value v'(x, y, c) and the lookup table vfun_inv(v', c), and produces the output code value o(x, y, c).

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention. In particular, the present invention has been described in the context of an inkjet printer which prints with cyan, magenta, yellow, and black colorants, but in theory the invention should apply to other types of printing technologies also. This includes multilevel inkjet printing in which more than three printing levels are available for at least one colorant at each pixel. Also, the invention can be applied to inkjet printers in which additional colorants, such as light cyan, light magenta, orange, or green inks are used.

| PARTS LIST | |
|---|---|
| 10 | raster image processor |
| 12 | digital image source |
| 20 | ink depletion processor |
| 22 | total colorant amount limit adjustor |
| 30 | multitone (or halftone) processor |
| 36 | inkjet printer |
| 40 | colorant volume function processor |
| 50 | ink depletion processor |

-continued

| PARTS LIST | |
|---|---|
| 60 | inverse colorant volume function processor |
| 62 | volumetric ink depletion processor |
| 70 | colorant volume LUT generator |
| 72 | colorant volume data source |
| 80 | inverse colorant volume LUT generator |
| 90 | colorant volume function processor |
| 100 | ink depletion processor |
| 110 | inverse colorant volume function processor |
| 112 | volumetric ink depletion processor |
| 140 | binary printer colorant volume function |
| 150 | multilevel printer colorant volume function |

What is claimed is:

1. A method for modifying an input digital image having an (x, y) array of pixels, each pixel having an input code value for one or more color channels, wherein said input code value has a nonlinear relationship to colorant volume, to form an output digital image containing output code values for each pixel subject to a total colorant amount limit, comprising:

a) determining an input colorant volume for each color channel of a pixel in response to the corresponding input code value and a colorant amount function that relates the input code value to the colorant volume for the corresponding color channel;

b) determining a modified colorant volume for each color channel of the image pixel when the sum of the input colorant volumes for the image pixel exceeds the total colorant amount limit, in response to the input colorant volume for each color channel and the total colorant amount limit, such that the sum of the modified colorant volumes for each color channel is less than the total colorant amount limit;

c) determining an output code value for each color channel of the pixel responsive to the modified colorant volume and an inverse colorant amount function that relates colorant volume to the output code value for the corresponding color channel, and d) repeating steps (a) through (c) for each pixel in the input digital image.

2. The method of claim 1 further including providing a lookup table for each color channel wherein the colorant amount function is provided by the lookup table.

3. The method of claim 1 wherein the colorant amount function and the inverse colorant amount function are substantially mathematically inverse operations from each other.

4. The method of claim 1 wherein the colorants are inks for use in an inkjet printer.

5. The method of claim 4 wherein the colorant volumes correspond to ink volumes.

6. The method of forming a color image in response to the modified digital image produced by claim 1.

7. A computer readable medium having a stored computer program to perform the method of claim 1.

* * * * *